(12) United States Patent
Schmid

(10) Patent No.: US 8,308,415 B2
(45) Date of Patent: Nov. 13, 2012

(54) BULK UNLOADING APPARATUS

(75) Inventor: Scott Michael Schmid, York, NE (US)

(73) Assignee: Cyclonaire Corporation, York, NE (US)

( * ) Notice: Subject to any disclaimer, the term of this patent is extended or adjusted under 35 U.S.C. 154(b) by 1211 days.

(21) Appl. No.: 10/350,239

(22) Filed: Jan. 23, 2003

(65) Prior Publication Data

US 2004/0146382 A1 Jul. 29, 2004

(51) Int. Cl.
*B65G 65/34* (2006.01)
(52) U.S. Cl. ........ 414/422; 414/376; 414/403; 414/572; 414/676; 298/27; 254/89 H; 254/93 R
(58) Field of Classification Search .................. 414/373, 414/376, 404, 403, 406, 422, 572, 676; 298/24, 298/27; 254/89 H, 93 R
See application file for complete search history.

(56) References Cited

U.S. PATENT DOCUMENTS

| | | | |
|---|---|---|---|
| 2,813,640 A * | 11/1957 | Loomis | 406/67 |
| 3,528,570 A | 9/1970 | Pase | |
| 3,865,347 A | 2/1975 | Pase | |
| 3,951,278 A | 4/1976 | Pase | |
| 4,275,869 A * | 6/1981 | Clements | 254/89 H |
| 4,461,455 A * | 7/1984 | Mills et al. | 254/3 R |
| 4,572,579 A * | 2/1986 | Saito | 298/1 A |
| 4,600,046 A * | 7/1986 | Bailey et al. | 164/34 |
| 5,387,058 A * | 2/1995 | Smoot | 406/145 |
| 5,542,500 A * | 8/1996 | Emrey | 187/273 |
| 5,542,806 A * | 8/1996 | Kang | 414/422 |
| 5,771,816 A * | 6/1998 | Zaguroli, Jr. | 108/147 |
| 5,979,605 A * | 11/1999 | Popp | 187/205 |
| 6,537,017 B2 * | 3/2003 | Stone | 414/672 |
| 6,719,258 B2 * | 4/2004 | Bryngelson et al. | 248/419 |

OTHER PUBLICATIONS

Martin® Boot-Lift® Palicar Connector Technical Data Sheet, Martin Engineering, Neponset, IL, 1997.
Martin® Boot-Lift® Railcar Connector web page, Martin Engineering, http://asp.martin-eng.com/products/railcrpg.php?RID=47.
HVI Lift Series web page, Houston Vibrator, http://www.houstonvibrator.com/lift.htm.
Martin® Boot-Lift® Vertical Connector web page, Martin Engineering, http://asp.martin-eng.com/products/railcrpg/php?RID=48.
Center Flow Hopper Car Airlift Rail Car Discharge Adapters web page, Smoot Co., http://www.smootco.com/infe11.htm.
9-Rail Car Unloading Smoot Co.® Discharge Adapter(s) data sheet, Smoot Co., p. S9-5.
United States Systems, Inc. Hopper Adapters web page, http://www.unitedstatessystems.com/hopper.htm.
Blenders, Conveyors, Elevators data sheet, CrustBuster® Speed King Inc.
Good Year Air Springs web page, http://www.goodyearindustrialproducts.com/airsprings/airapps.html.

* cited by examiner

*Primary Examiner* — Scott Lowe
(74) *Attorney, Agent, or Firm* — Greer, Burns & Crain, Ltd.

(57) ABSTRACT

An apparatus for use in unloading bulk material from containers that is vertically adjustable and provides a mechanism for maintaining a coupling engagement with an outlet on a container. The apparatus has a plurality of inflatable flexible members configured and arranged to maintain the coupling engagement of the apparatus to the container outlet.

16 Claims, 5 Drawing Sheets

US 8,308,415 B2

BULK UNLOADING APPARATUS

BACKGROUND OF THE INVENTION

The present invention relates generally to an apparatus for unloading bulk materials from containers, and more specifically relates to an apparatus for use in unloading bulk material from containers having at least one discharge outlet at an elevation spaced above the apparatus, where the apparatus is vertically adjustable to engage the discharge outlet.

Many bulk-carrying containers, such as railroad hopper cars, typically contain on a funnel-shaped discharge outlet or "hopper" on an underside so that bulk cargo, such as, for example, grain, cement powder, fly ash and coal, can be quickly discharged through the underside. Thus, an apparatus for receiving the bulk cargo as it is discharged through the hopper is necessary to collect and channel the bulk cargo as it is discharged. To this end, attempts have been made to provide an apparatus that connects to the hopper at the underside of the bulk-carrying containers that receive the bulk cargo as it is discharged and channel the bulk cargo to a desired location, such as a storage tank, transport vehicle, silo, or the like. These previous attempts have typically involved apparatuses that incorporate a four-bar linkage design to lift a top frame to the hopper. Such four-bar linkage systems include sliding surfaces and pins that may be easily fouled by bulk cargo or other debris, causing binding in the system and ultimately failure of the system to operate.

Moreover, the coupling between the previous apparatuses and the hopper is frequently unstable. Four-bar linkage systems typically require the top frame to be parallel to the bottom frame, which is generally parallel with the ground surface upon which it rests. The top frame must therefore remain level with the grade of the ground surface underneath the hopper, while the hopper itself may not be level with grade. Thus, coupling between previous apparatuses and the hopper is unstable.

Furthermore, apparatuses incorporating the four-bar linkage system have limited lifting ability, especially at low positions, because the four-bar linkage typically requires some mechanical advantage before the drive actuator can effectively transfer its force to lift the top frame. With a 4-bar linkage, at low levels, the actuator provides enough force to lift the mechanism, but the actuator is nearly horizontal, and therefore has very little lifting force directed vertically. This results in an inability to seal well or provide enough lifting force to mate properly at lower height levels.

Thus, while unloading apparatuses have been available for many years, the manner in which they are lifted, aligned with, and coupled to the hopper has been the subject of continuing efforts to provide a simple and effective mechanism for providing an improved lifting mechanism for lifting the unloading apparatus to the hopper, maintaining adequate coupling of the apparatus to the hopper, and for preventing disengagement of the unloading apparatus from the hopper.

SUMMARY OF THE INVENTION

The present invention is related to an apparatus for use in unloading bulk material from containers that is vertically adjustable and provides a mechanism for maintaining a coupling engagement with an outlet on a container. The present invention comprises an apparatus having a plurality of inflatable flexible members configured and arranged to maintain the coupling engagement of the apparatus to the container outlet.

DETAILED DESCRIPTION OF THE INVENTION

Figure 1:
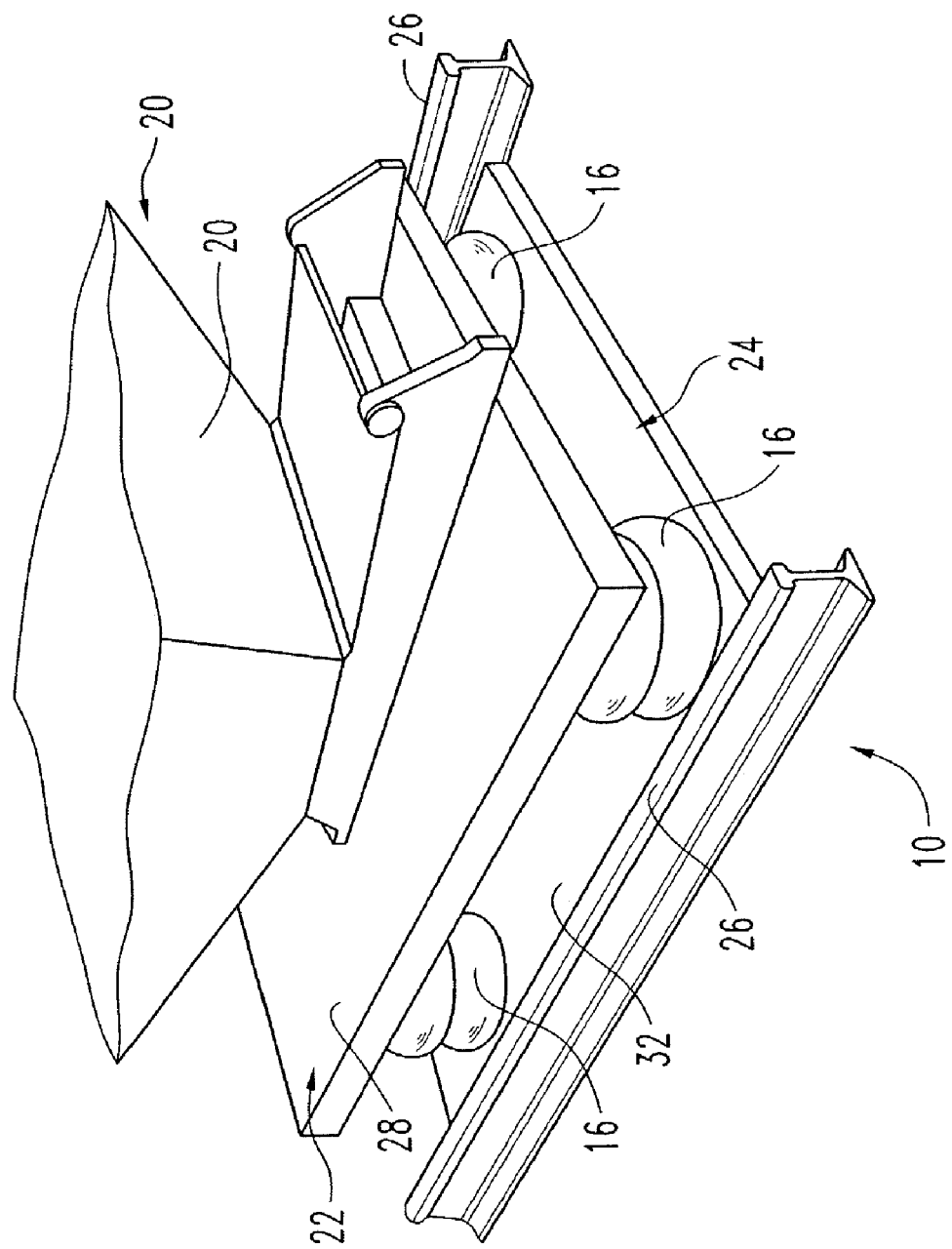
FIG. 1 is a side elevation view of the unloading apparatus of the instant invention coupled to a railroad hopper car.

Turning now to FIGS. 1-4, the bulk unloading apparatus of the instant invention, designated generally at 10, includes a generally rectangular frame assembly 12 (best shown in FIG. 3), a flexible boot assembly 14 (best shown in FIG. 4), and a plurality of inflatable flexible members 16. While the instant invention is illustrated in connection with a railroad hopper car having a discharge outlet or "hopper" on an underside thereof, those skilled in the art will appreciate that the bulk unloading apparatus 10 of the instant invention is contemplated for use with any container of the type having at least one discharge outlet at an elevation spaced above the apparatus. The instant bulk unloading apparatus 10 will be illustrated and described with a railroad hopper car 18 to provide a sample environment for operation of the bulk unloading apparatus.

Typically, railroad hopper cars 18 include a funnel-shaped discharge outlet 20, which, when open, allows discharge of the bulk cargo within the railroad hopper car. Thus, the instant bulk unloading apparatus 10 is configured and arranged to matingly engage the discharge outlet 20, and preferably includes a mechanism for sealingly engaging a circumference of the discharge outlet to prevent disengagement or undesired spillage from the discharge outlet.

Figure 4:
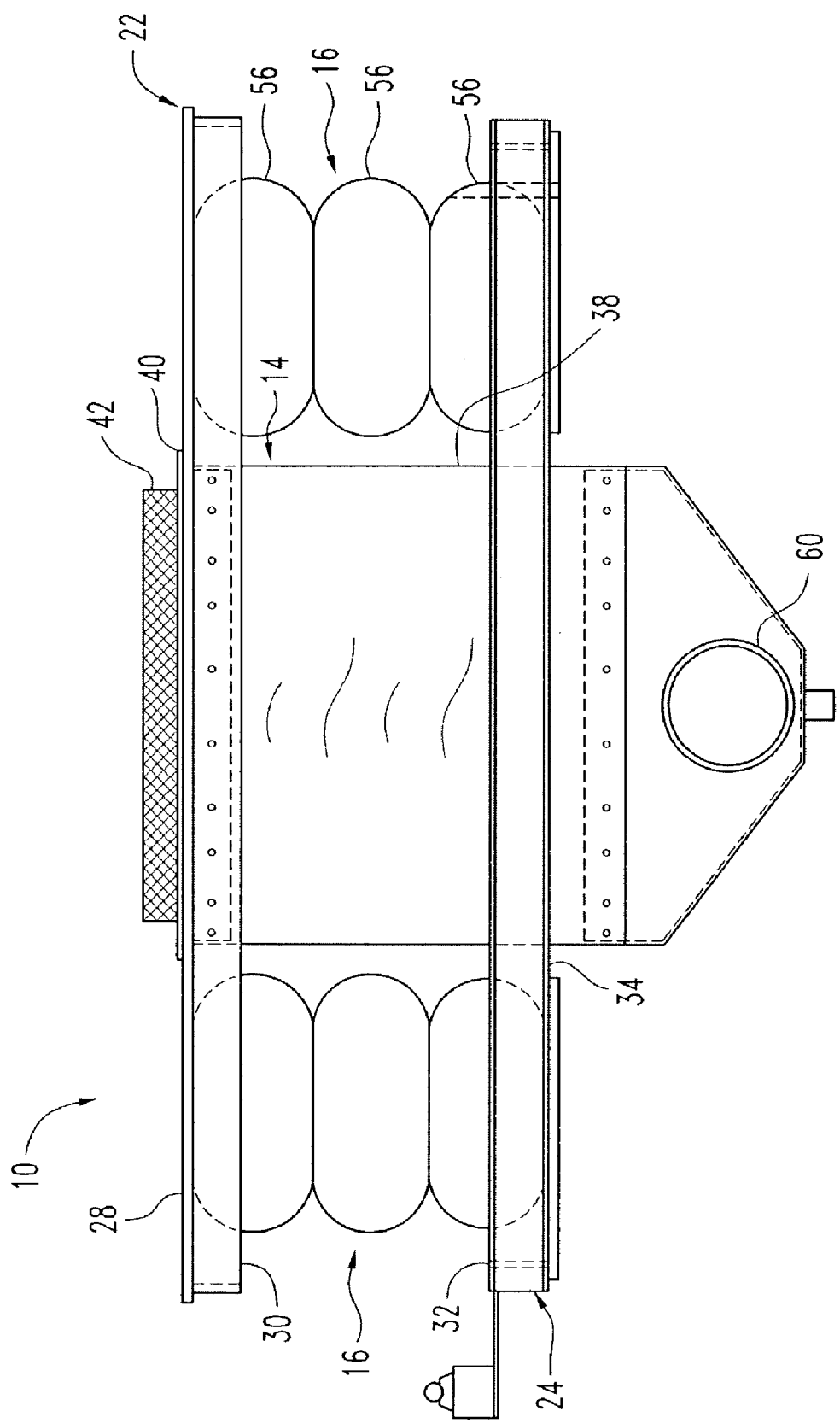
FIG. 4 is a side elevation view of the unloading apparatus illustrated in FIG. 1.

The frame assembly 12 preferably includes an upper frame 22 and a lower frame 24 with the plurality of inflatable flexible members 16 disposed therebetween. In the preferred embodiment, both the upper frame 22 and lower frame 24 are generally rectangular in shape and are generally coextensive with one another, and have dimensions configured to permit the entire assembly 12 to rest within the confines of two parallel railroad tracks 26. The upper frame 22 includes a generally planar top portion 28 and a generally planar bottom portion 30, and the lower frame 24 includes a generally planar top portion 32 and a generally planar bottom portion 34. When assembled, and as shown in FIG. 4, the bottom portion 30 of the upper frame 22 and the top portion 32 of the lower frame 24 are disposed opposite one another, with the plurality of inflatable flexible members 16 disposed therebetween.

In the preferred embodiment, each inflatable flexible member 16 includes four mounting holes, two disposed at a top portion and two disposed on a bottom portion. Similarly, the upper frame 22 and lower frame 24 each include mating mounting holes. When the inflatable flexible members 16 are mounted between the upper and lower plates 22, 24 and aligned with the mounting holes of the upper and lower plates, bolts matingly engage the aligned mounting holes on the inflatable flexible member 16 and on the upper and lower plates 22, 24 to maintain each inflatable flexible member 16 in locking engagement with both the upper and lower plates.

Figure 5:
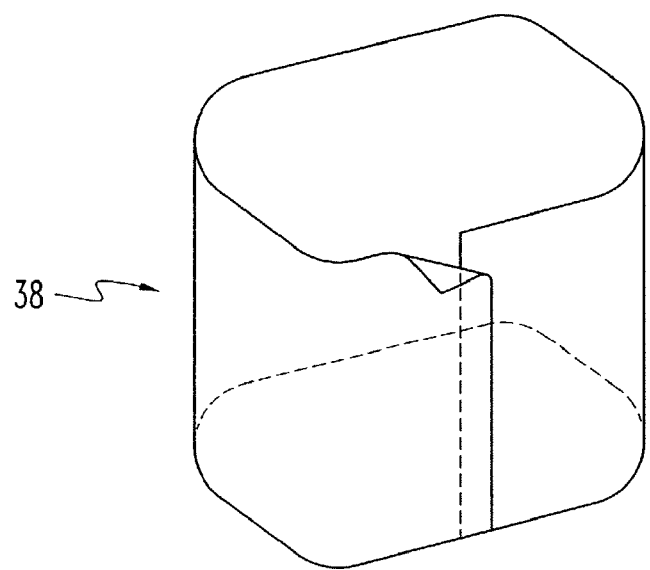
FIG. 5 is a side perspective view of the boot assembly of the unloading apparatus illustrated in FIG. 1.

The flexible boot assembly 14 preferably includes boot member 38 (best shown in FIG. 5), a generally rectangular flat plate 40, and sealing gasket 42. To accommodate the boot assembly 14, which must extend between the discharge outlet 20 of the hopper car 18 and will normally terminate at a railpan, but can connect to any receiving equipment/vessel at the opposite end thereof, both the upper and lower frames 22, 24 include openings 46 to permit passage of the boot member 38. The openings 46 may include a variety of shapes, and are typically configured according to the shape of the boot member 38.

The boot member 38 is typically cylindrical or oblong in cross-section, but may be configured to have any shape with a hollow passage therethrough to allow passage of the bulk cargo. Accordingly, the openings 46 in the upper and lower plates 22, 24 may be cylindrical, oblong, or any other shape assumed by the boot member 38. The boot member 38 is made of flexible material, preferably rubber reinforced canvas, and is preferably disposed between the plate 40 that is configured to extend from the top portion 28 of the upper frame 22 to the railpan or other receiving equipment. As the upper frame 22 is vertically displaced from the lower frame 24, the boot member 38 expands in a vertical direction, preferably up to approximately 28 inches. A retaining bracket of conventional construction (not shown) is disposed on an underside of the plate 40 which retains a top portion of the boot member 38 by bolting through the boot material.

Also included in the flexible boot assembly 14 is the sealing gasket 42, which is preferably made of collapsible sealing foam or of an elastomer. As those skilled in the art will appreciate, determination of the composite material for the annular ring member 42 depends upon the type of material being unloaded. The sealing gasket 42 is generally rectangular, with an outer dimension configured to engage an outer circumference of the discharge outlet 20 of a hopper car 18 as shown. The sealing gasket 42 helps prevent disengagement and/or spillage of the bulk cargo as it is discharged. As it extends, the unloading apparatus 10 exerts an upward force, causing the sealing gasket 42 disposed thereon to exert an upward force on the discharge outlet 20. This upward force maintains engagement of the sealing gasket 42 with the discharge outlet 20.

The instant unloading apparatus 10 has a first height, which is the height of the apparatus in its fully collapsed position, and has a second height, which is the height of the apparatus in its fully extended position. The unloading apparatus 10 is configured so that it may occupy either its fully open or fully collapsed positions, or any position therebetween, depending on the height necessary to couple the unloading apparatus to the discharge outlet 20 of the hopper car 18. In the preferred embodiment, the first height is approximately 4-5 inches to allow retraction of the entire assembly below the rail height when in the lowered position, while the second height is approximately 20.5 inches.

Containers under which the instant unloading apparatus 10 is configured to operate have a vertical clearance that is usually somewhat lower in vertical height than the fully extended second height of the unloading apparatus 10. Thus, the unloading apparatus 10 is typically placed beneath the discharge outlet 20 in the fully collapsed position first position, on a surface between the railroad tracks 26, with the upper and lower frames 22, 24 generally parallel with one another and with a grade of the surface on which the unloading apparatus is placed. Subsequently, the unloading apparatus 10 is sufficiently extended so that the boot assembly 14 is sufficiently elevated to reach the discharge outlet 20.

The plurality of inflatable flexible members 16 are therefore simultaneously inflated to elevate the upper frame 22 relative to the lower frames 24. Since the boot assembly 14 is coupled to the top frame 22, the boot assembly 14 is elevated along with the upper plate. Each of the inflatable flexible members has a predetermined first height when fully collapsed, and a predetermined second height when fully expanded. When the instant unloading apparatus 10 is in its fully collapsed first position, the inflatable flexible members 16 are also fully collapsed. When the instant unloading apparatus is in its fully expanded second position, the inflatable flexible members 16 are also fully expanded. Preferably, the fully expanded inflatable flexible members 16 are approximately 20.5 inches in vertical height.

In the preferred embodiment, each of the inflatable flexible members 16 is a single-walled structure capable of expanding upon inflation with air or other fluid, and is preferably made from rubber. Each inflatable flexible member 16 is preferably configured as a bellows with a plurality of convolutions 56 that are unitary with one another and stacked upon one another in a vertical direction so that the inflatable flexible member may expand and contract in an accordion-like fashion. Such an inflatable flexible member 16 may be commercially available from Goodyear, for example. In the preferred embodiment, each inflatable flexible member maintains an internal air pressure of 15-20 psi. The orientation and configuration of the convolutions promote vertical expansion of the inflatable flexible members 16 when fluid is provided to the inflatable flexible members.

While the instant invention contemplates inclusion of any number of inflatable flexible members 16, ranging from a single inflatable flexible member to an indefinite number of inflatable flexible members, the preferred embodiment includes four inflatable flexible members, one of which is disposed within each of the four corners of the generally rectangular frame assembly 12. When disposed within each of the four corners of the frame assembly 12, the four inflatable flexible members confer a generally uniform pressure on the upper frame 22 and add flexibility to a sealing plane between the annular ring member 42 and the discharge outlet 20. Thus, even at low heights before the upper frame 22 is extended vertically, bulge of the four inflatable flexible members 16 at each of the four corners of the instant apparatus creates an increased effective diameter, which exerts a greater force than typical four-bar linkage apparatuses at the same height. In this manner, the instant unloading apparatus 10 is capable of forming a secure seal with the discharge outlet 20, even in its fully collapsed position.

Figure 2:
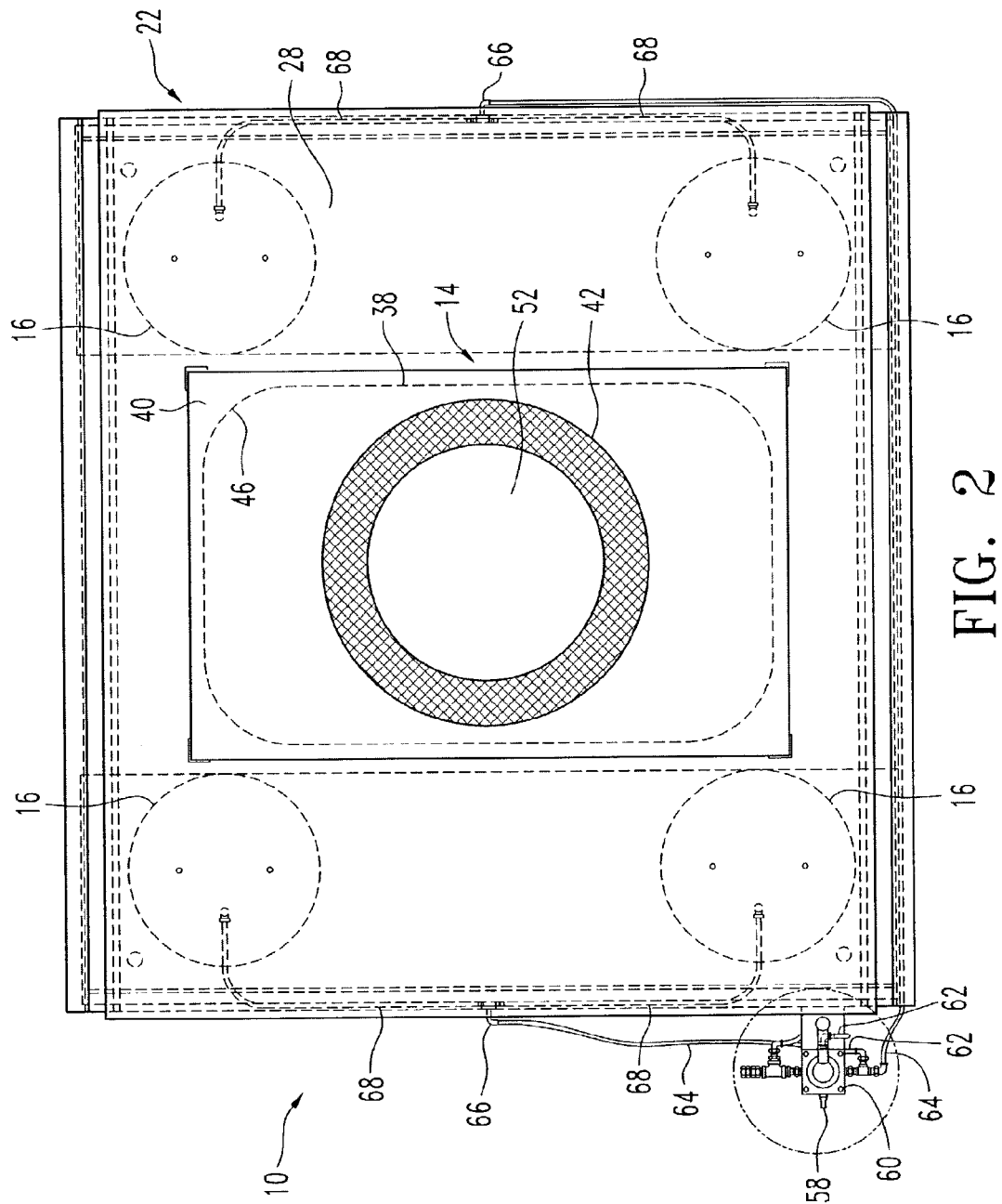
FIG. 2 is a top plan view of the unloading apparatus illustrated in FIG. 1.
Figure 3:
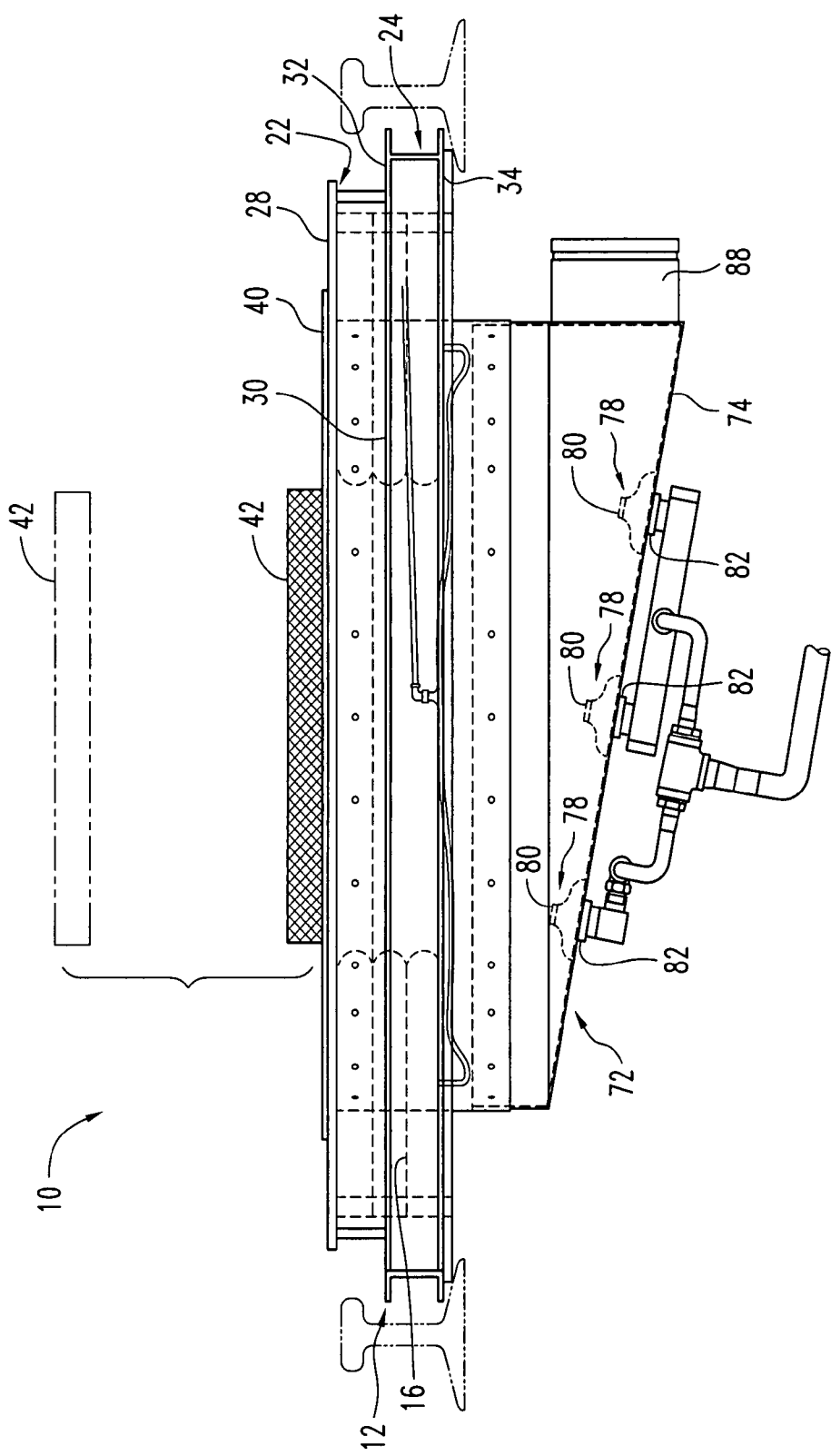
FIG. 3 is a side elevation view of the unloading apparatus illustrated in FIG. 1.
Figure 6:
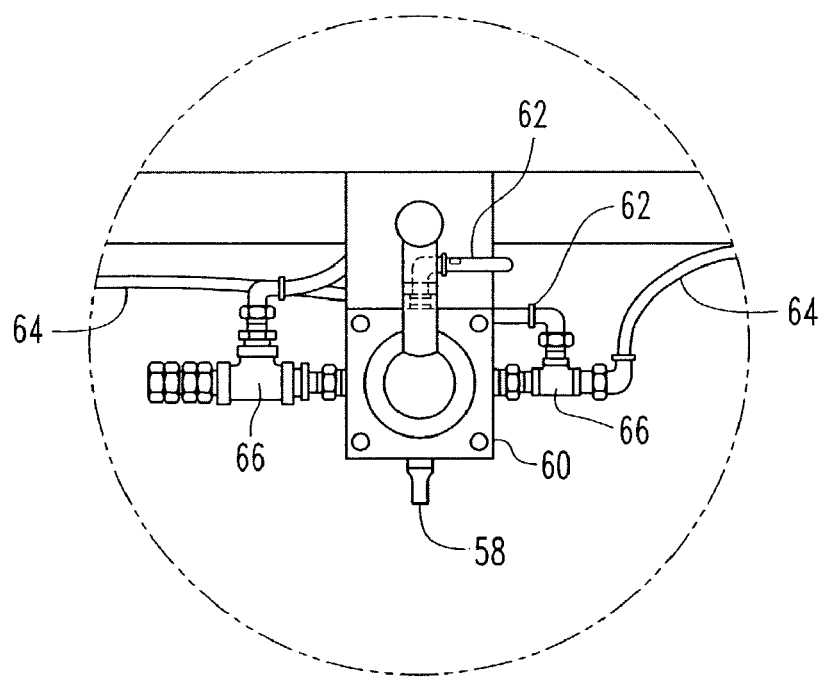
FIG. 6 is a side elevation view of the regulator valve used in connection with the instant invention.

To selectively inflate the plurality of inflatable flexible members 16, and referring to FIGS. 2 & 6, a source of compressed air is coupled to a conventional regulator valve (neither of which are shown) that is preferably connected to an air fitting 58 via a conventional air hose and connector for providing compressed air to the inflatable flexible members for inflating and deflating the inflatable flexible members. A 3-way hand valve 60 is provided and includes two outlet ports 62 that are each coupled to an outlet tube 64. Each outlet tube 64 terminates in a tee-valve fitting 66, to which two tubes 68 are attached. Each of the tubes 68 terminates within the interior of an inflatable flexible member 16 to selectively inflate or deflate the inflatable flexible member, depending upon the position of the 3-way hand valve 60. In this way, each of the inflatable flexible members is provided with a source of compressed air for inflation and deflation. To control the inflation of the flexible members 16, the 3 way hand valve, when turned in a first direction, supplies a constant source of compressed air to the inflatable flexible members, and when turned in a second direction, relieves air pressure so that the inflatable flexible members 16 will deflate. In this way, an operator is able to manually control inflation and deflation, and consequently the expansion and contraction, of the instant unloading apparatus 10.

In operation, once the instant unloading apparatus 10 has been arranged beneath the hopper car 18, the operator may selectively expand the height of the unloading apparatus by actuating the 3-way hand valve 60. By turning the hand valve 60 in the first direction, compressed air is directed to each of the four inflatable flexible members 16. The air flow is maintained until the annular ring member 42 disposed on the upper frame 22 is vertically displaced by a distance sufficient to permit contact and mating engagement with the discharge port 20 of the hopper car 18. Once the sealing gasket 42 and discharge outlet 20 are coupled, the flow of compressed air stops and maintains a constant pressure in the Inflatable Flexible Members 16. The downward force exerted by the gross weight of the hopper car 18 reaches an equilibrium with the force exerted by the compressed air within the inflatable flexible member 16 so that the inflatable flexible member 16 is prevented from further expansion unless and until the downward force exerted by the hopper car 18 is relieved. In this way, the height of the upper frame 22 above the lower frame 24, and consequently the mating engagement of the unloading apparatus 10 to the discharge outlet is maintained.

Once the unloading apparatus 10 is matingly and sealingly engaged with the discharge outlet, the bulk cargo material within the hopper car 18 is free to descend into the unloading apparatus via the boot assembly 14. Because the bulk cargo material is generally intended to be stored or transported to a different location, the bottom portion of the boot assembly includes a transport assembly 72 (best shown in FIG. 3) to remove the discharged bulk cargo material from the underside of the instant unloading apparatus 10. The transport assembly 72 can be designed suitably for feed into a conveying system or receiving vessel or chute. The transport assembly 72 has a sloped bottom 74 extending to a conduit 88 for transporting the material to a destination. The sloped bottom enables gravity to assist the transporting of the material. Also, the illustrated piping is preferably connected to a source of positive air pressure which is applied to a number of aerators 78 via couplings 82 that extend through openings in the bottom 74. The aerators 78 have inverted flexible rubber cup shaped members that are held in place by bolts 80. Air is injected into the assembly 72 by the flexible members for the purpose of fluidizing the material to assist the transporting of the material.

As the bulk cargo material is discharged from the hopper car 18, less and less of the bulk cargo material remains within the hopper car 18. Consequently, the gross weight of the hopper car 18 decreases, and the vertical displacement of the hopper car above the surface on which the unloading apparatus 10 rests may also increase. The inflatable flexible members 16 of the instant invention are therefore configured to act as air springs, compensating for gradual changes in this vertical displacement to prevent disengagement of the unloading apparatus 10 from the hopper car 18. When in the first position, the 3-way hand valve 60 is turned to supply a constant source of compressed air to the inflatable flexible members. As the vertical displacement increases between the hopper car 18 and the surface below, there is less force on the unloading apparatus 10 as a result of the decrease in gross weight of the hopper car 18. Accordingly, there is a shift in equilibrium, and the inflatable flexible members 16 will expand further to maintain a mating and sealing engagement with the discharge outlet 20. In this manner, the unloading apparatus 10 of the instant invention maintains a constant seal with the discharge outlet 20 of the hopper car 18 even as the hopper car gradually empties and increases its vertical displacement from the surface below.

Similarly, unlike conventional bulk unloading apparatuses, the instant unloading apparatus 10 is capable of operating on a non-level grade. When the frame assembly 12 of the instant invention is placed on an uneven or non-level surface, as is frequently the case with the surface between the railroad tracks 26, each inflatable flexible member 16 provided with the instant invention may exhibit disparate expansion levels. Compressed air will be provided to each of the four inflatable flexible members 16 at a constant pressure and each will begin to expand in a uniform manner. However, if a first end of the frame assembly 12 is higher than a second end, the portion of the sealing gasket 42 associated with that first end will effectively have a greater vertical displacement from the ground below, despite the fact that the inflatable flexible members are uniformly expanding. Thus, the portion of the sealing gasket 42 associated with the first end will contact the discharge outlet 20 prior to the portion associated with the second end.

Thus, once the portion of the sealing gasket 42 associated with the first end of the frame assembly 12 contacts the discharge outlet 20, the downward force exerted by the gross weight of the hopper car 18 will reach an equilibrium with the upward force exerted by the expanded inflatable flexible member 16, which will not expand any further, but will maintain its expansion. However, the inflatable flexible members 16 associated with the second end of the frame assembly 12 (the end that is lower and closer to the ground) will continue to expand until the portion of the annular ring member 42 associated with the second end of the frame assembly contacts the discharge outlet 20 and reaches an equilibrium with the downward force exerted by the gross weight of the hopper car 18.

While a particular embodiment of the present unloading apparatus has been described herein, it will be appreciated by those skilled in the art that changes and modifications may be made thereto without departing from the invention in its broader aspects and as set forth in the following claims.

Various features of the invention are set forth in the following claims.

What is claimed is:

1. An apparatus for use in unloading bulk material from containers having at least one discharge outlet at an elevation spaced above the apparatus, said apparatus being vertically adjustable to engage the discharge outlet so that bulk material can be received during unloading thereof, said apparatus comprising:

a generally rectangular frame assembly having four corners and having an upper portion and a lower portion that are generally coextensive with one another, said upper portion defining an upper opening and said lower portion defining a lower opening, said upper opening and said lower opening being aligned with each other so that material may pass through each of said upper and lower openings, said upper portion being in engagement with and forming a seal with the at least one discharge outlet;

a plurality of inflatable flexible members positioned between said upper and lower portions;

a flexible boot assembly having a first end and an opposing second end, said first end being mounted to said upper portion, said boot assembly defining a passage for communicating material from said upper opening in said upper portion to said lower opening in said lower portion; and a valve coupled to said plurality of inflatable flexible members and configured to automatically supply a fluid to said members to raise said upper portion and maintain said seal between said upper portion and the discharge outlet as the elevation of the discharge outlet changes during unloading of the bulk material;

said plurality of inflatable flexible members being disposed between said upper and lower portions such that one of said plurality of inflatable flexible members is disposed at each of said four corners of said frame assembly for changing the elevation of the upper portion relative to the lower portion by selectively varying the inflation of said members;

said upper portion being supported in position to engage the discharge outlet by said flexible members.

2. The apparatus of claim 1 wherein said inflatable flexible members are air springs.

3. The apparatus of claim 1 wherein each of said inflatable flexible members has three chamber convolutions.

4. The apparatus of claim 3 wherein each of said convolutions are configured to expand and contract.

5. The apparatus of claim 1 wherein said flexible boot assembly is rubber-reinforced canvas.

6. The apparatus of claim 1 wherein said inflatable flexible members comprise rubber.

7. The apparatus of claim 1 wherein said inflatable flexible members inflate to a predetermined height in a vertical direction.

8. The apparatus of claim 1 wherein said flexible boot assembly is configured to extend in a vertical direction approximately 28 inches.

9. The apparatus of claim 1 wherein said upper portion and said lower portion each include a solid upper surface and a solid lower surface respectively extending from said upper and lower openings to a periphery of said upper and lower portions, said inflatable flexible members being positioned between said lower surface of said upper portion and said upper surface of said lower portion.

10. The apparatus of claim 1, wherein said boot assembly includes a sealing gasket configured to form the seal about the discharge outlet.

11. A vertical lift of the type used for unloading bulk materials from a container having a hopper bottom comprising:
an upper horizontal generally rectangular frame for coupling said vertical lift to the hopper bottom;
a horizontal, generally rectangular lower frame;
said upper and lower frames each having an opening through which bulk materials can pass to unload the container;
a plurality of spaced apart inflatable members disposed between said upper and lower frames for lifting said upper frame in a vertical direction to contact and form a seal with the hopper bottom, said spaced apart inflatable members being located adjacent each corner of said upper and lower frames and being configured and arranged to have an opening between said spaced apart inflatable members and coextensive with said openings in said upper and lower frames such that the bulk materials may pass therethrough and further configured for supporting said upper frame and stabilizing said upper frame to be coextensive with said lower frame; and
a valve coupled to said plurality of inflatable members and configured to automatically supply a fluid to said members to raise said upper frame and maintain said seal between said upper frame and the hopper bottom as an elevation of the hopper bottom changes during unloading of the bulk materials.

12. The vertical lift of claim 11 wherein said upper frame further comprises sealing means for sealingly engaging the hopper bottom.

13. The vertical lift of claim 12 wherein said sealing means comprises one of a foam or elastomeric gasket.

14. The vertical lift of claim 11 wherein said upper frame comprises a top end portion and a bottom end portion movable with respect to said top end portion, an extendable boot assembly extending between said top and bottom end portions, and a sealing gasket coupled to said top end portion for matingly engaging the hopper bottom.

15. The vertical lift of claim 11 wherein said valve comprises a source of compressed air.

16. A method of unloading containers of the type having a hopper bottom comprising:
positioning a vertical lift unloading device under the hopper bottom of the container, said device having an upper frame portion and a lower frame portion that are generally coextensive with one another and are attached to one another by a plurality of inflatable flexible members disposed between said upper and lower frame portions at spaced locations around the openings therein for changing the elevation of the upper frame portion relative to the lower frame portion by selectively varying the inflation of the members;
initializing a source of compressed air;
inflating said plurality of inflatable flexible members until said upper frame portion of said vertical lift unloading device reaches a predetermined height; and
coupling the vertical lift unloading device upper frame portion to the hopper bottom and forming a seal between said upper frame portion and the hopper bottom; and
automatically supplying air to said plurality of inflatable flexible members to maintain said seal between said upper frame and the hopper bottom as an elevation of the hopper bottom changes during unloading.

* * * * *